United States Patent
Glencross

(10) Patent No.: US 11,132,657 B2
(45) Date of Patent: Sep. 28, 2021

(54) TRANSACTION FLOW

(75) Inventor: Stephen Glencross, Fife (GB)

(73) Assignee: NCR Corporation, Atlanta, GA (US)

( * ) Notice: Subject to any disclaimer, the term of this patent is extended or adjusted under 35 U.S.C. 154(b) by 889 days.

(21) Appl. No.: 13/595,254

(22) Filed: Aug. 27, 2012

(65) Prior Publication Data

US 2014/0058943 A1 Feb. 27, 2014

(51) Int. Cl.
| | |
|---|---|
| *G06Q 20/18* | (2012.01) |
| *G07F 19/00* | (2006.01) |
| *G06Q 20/10* | (2012.01) |
| *G06Q 20/32* | (2012.01) |
| *G06Q 40/02* | (2012.01) |

(52) U.S. Cl.
CPC ......... *G06Q 20/18* (2013.01); *G06Q 20/1085* (2013.01); *G06Q 20/3274* (2013.01); *G07F 19/20* (2013.01); *G07F 19/206* (2013.01); *G06Q 40/02* (2013.01)

(58) Field of Classification Search
None
See application file for complete search history.

(56) References Cited

U.S. PATENT DOCUMENTS

| | | | | | |
|---|---|---|---|---|---|
| 5,250,787 | A | * | 10/1993 | Arii | G11B 7/0037 235/375 |
| 5,892,900 | A | * | 4/1999 | Ginter | G06F 21/10 726/26 |
| 5,982,893 | A | * | 11/1999 | Hughes | G06Q 20/401 705/75 |
| 6,590,589 | B1 | * | 7/2003 | Sluiman | G06F 8/34 715/751 |
| 6,658,568 | B1 | * | 12/2003 | Ginter | G06F 21/10 348/E5.006 |
| 6,684,389 | B1 | * | 1/2004 | Tanaka | G06F 8/41 717/140 |
| 7,089,208 | B1 | * | 8/2006 | Levchin | G06Q 20/02 705/39 |
| 8,201,729 | B1 | * | 6/2012 | Block | G06Q 20/1085 235/379 |
| 8,296,477 | B1 | * | 10/2012 | Polk | G06Q 99/00 705/35 |
| 8,321,346 | B2 | | 11/2012 | Celi et al. | |

(Continued)

FOREIGN PATENT DOCUMENTS

EP 1942473 7/2008

OTHER PUBLICATIONS

Gao et al. Understanding 2D-BarCode Technology and Applications in M-Commerce—Design and Implementation of A 2D Barcode Processing Solution. 31st Annual International Computer Software and Applications Conference(COMPSAC 2007) (Year: 2007).*

(Continued)

*Primary Examiner* — Zeshan Qayyum
*Assistant Examiner* — Eduardo D Castilho
(74) *Attorney, Agent, or Firm* — Schwegman, Lundberg & Woessner

(57) ABSTRACT

A method of encoding a transaction flow is described. The method comprises: receiving information from a user about a transaction type to be executed; creating a transaction flow comprising a sequence of states, where at least some states include text to be displayed and inputs to be enabled for that state; and encoding the transaction flow into a machine-readable code.

6 Claims, 7 Drawing Sheets

(56) References Cited

U.S. PATENT DOCUMENTS

| | | | | |
|---|---|---|---|---|
| 8,353,448 B1* | 1/2013 | Miller | G06Q 20/3274 | 235/379 |
| 8,459,545 B1* | 6/2013 | Hammer | G06Q 30/06 | 235/379 |
| 2002/0152241 A1* | 10/2002 | Hepworth | G06K 7/14 | 715/236 |
| 2002/0188661 A1* | 12/2002 | Casais | G06F 9/45512 | 709/202 |
| 2009/0222726 A1* | 9/2009 | Kintzley | G06F 9/45512 | 715/704 |
| 2009/0265610 A1* | 10/2009 | Leonard | G06F 9/451 | 715/234 |
| 2010/0223185 A1* | 9/2010 | Campbell | G06Q 20/10 | 705/44 |
| 2011/0231909 A1* | 9/2011 | Shibuya | G06F 21/31 | 726/5 |
| 2012/0173311 A1* | 7/2012 | Chang | G06Q 20/1085 | 705/14.1 |
| 2012/0197797 A1* | 8/2012 | Grigg | G06Q 20/1085 | 705/43 |
| 2012/0305640 A1* | 12/2012 | Long | G06Q 20/042 | 235/379 |
| 2013/0124411 A1* | 5/2013 | Kobres | G06Q 40/02 | 705/43 |
| 2014/0019336 A1* | 1/2014 | Browne | G06Q 40/02 | 705/39 |

OTHER PUBLICATIONS

Gao et al. A 2D Barcode-Based Mobile Payment System. 2009 Third International Conference on Multimedia and Ubiquitous Engineering (Year: 2009).*

* cited by examiner

TRANSACTION FLOW

FIELD OF INVENTION

The present invention relates to a transaction flow. In particular, although not exclusively, the invention relates to a transaction flow executable by a self-service terminal and/or by a mobile device.

BACKGROUND OF INVENTION

One common type of self-service terminal is an automated teller machine (ATM). ATMs enable users to execute banking and other transactions in an unattended environment. ATMs are complex machines that require highly-reliable and secure software and hardware.

Many devices (computers, mobile phones, internet tablets, and the like) are now connected to the Internet. This allows people to execute transactions using these devices. However, these devices cannot dispense or receive cash, so there is a desire to be able to use ATMs for Internet transactions involving cash.

At present, to add a new transaction to an ATM requires significant changes to the software at the ATM, and possibly also software executing on a transaction server. Implementing these software changes is time consuming and can be expensive. It would be advantageous if there was a simpler way of adding transactions to ATMs.

It is among the objects of an embodiment of the present invention to provide a simple mechanism for adding a new transaction to an SST, such as an ATM.

SUMMARY OF INVENTION

Accordingly, the invention generally provides methods, systems, apparatus, and software for encoding a transaction flow that can be read and executed by an SST and/or by a mobile device.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of encoding a transaction flow, the method comprising: receiving information from a user about a transaction type to be executed; creating a transaction flow comprising a sequence of states, where at least some states include text to be displayed and inputs to be enabled for that state; and encoding the transaction flow into a machine-readable code.

The method may comprise the further step of receiving information from a user identifying a transacting party.

The method may comprise the further step of receiving information from a user indicating a type of authentication to be provided when the transaction flow is executed by a self-service terminal. The type of authentication may comprise a bank card or other card (such as a credit card or a loyalty card), a biometric input, a passcode, or the like.

One or more states in the sequence of states may include a state identifier. Every state in the sequence of states may include a state identifier.

The inputs to be enabled for a state may relate to function defined keys (FDKs), keys on a numeric keypad (such as an encrypting PINpad), a card reader, a biometrics reader, an NFC reader, an RFID reader, a cash deposit (or acceptor) slot, or the like.

The method may comprise the further step of validating the transaction flow prior to encoding the transaction flow into a machine-readable code.

The step of validating the transaction flow prior to encoding the transaction flow into a machine-readable code may include contacting the identified transacting party. Where the identified transacting party comprises a Web server, the step of contacting the identified party may comprise pinging the Web server, or sending a message to the Web server, or ascertaining details of an interface to a Web service.

The step of encoding the transaction flow into a machine-readable code may include the sub-step of encoding the transaction flow into a two dimensional (2D) barcode, such as a QR code (trade mark).

The method may comprise the further step of encrypting the transaction flow prior to encoding the transaction flow into a machine-readable code.

The method may comprise the further step of digitally signing the transaction flow prior to encoding the transaction flow into a machine-readable code.

The method may be implemented by a server (such as a Web service server) that receives the information from a client (such as a mobile device) operated by the user. Alternatively, the method may be implemented by a mobile device.

Where the method is implemented by a server, the method may comprise the further step of transmitting the encoded transaction flow to a mobile device associated with (or operated by) the user.

By virtue of this aspect, a transaction flow can be created and encoded so that it can subsequently be executed by an SST, without that SST requiring any prior knowledge of that transaction flow. Although it is known that an ATM transaction can be pre-staged, this differs from a pre-staged ATM transaction in that (i) a pre-staged ATM transaction relates to an existing transaction type at that ATM, (ii) in a pre-staged ATM transaction, the transaction request is already populated and only requires transmission by the ATM, and (iii) a specific transaction may or may not be pre-staged as part of the transaction flow. In contrast, this aspect allows a transaction flow to be created that does not currently exist on an SST (such as an ATM). According to this aspect, it is not just a new transaction type that can be created, but also a transaction flow associated with that new transaction type. In addition, this aspect enables a transaction of that new transaction type to be executed. Furthermore, the SST may collate information from the user when it implements the states that define the transaction flow, in addition to any information collated when the transaction flow was encoded.

According to a second aspect there is provided a method of executing a transaction at a self-service terminal, where the transaction is based on a transaction flow received from a user, the method comprising: reading a machine-readable code presented by the user; interpreting the read code to ascertain a sequence of states to be executed by the self-service terminal; parsing each state to ascertain user interaction information for that state; implementing the ascertained user interaction information for that state; receiving an input from the user in response to the user interaction information; and moving to a next state in the sequence of states until a final state is reached indicating the completion of the transaction.

Reading a machine-readable code may comprise reading a 2D barcode. The 2D barcode may be presented by a user on a display of a portable device, such as a mobile phone (also referred to as cellular radiofrequency telephone or a cellphone).

The method may comprise the further step of decrypting the machine-readable code prior to interpreting the read code.

The method may comprise the further step of validating a digital signature encoded in the machine-readable code prior to interpreting the read code.

Parsing each state to ascertain user interaction information for that state may include parsing each state to ascertain: text to be displayed to the user, one or more inputs to be enabled for that state, and one or more next states to move to depending on which input is activated by the user.

An input may be activated by the user inserting or presenting a device (such as a card or a radiofrequency tag), selecting an option using a key (such as an FDK or a PINpad key), presenting part of himself/herself to a biometrics reader (for example, a finger or hand for fingerprint or hand recognition), inserting cash into a cash deposit module, or the like.

By virtue of this aspect, a transaction flow can be read, parsed, and executed by an SST, without that SST requiring any prior knowledge of that transaction flow, and without the SST requiring any prior knowledge of a service provider that will fulfill a transaction associated with that transaction flow.

According to a third aspect there is provided a self-service terminal operable to implement a new transaction flow by reading and interpreting an encoded transaction flow presented by a user of the self-service terminal.

According to a fourth aspect there is provided a Web service operable to interact with a mobile application executing on a mobile device, the Web service being operable to implement the steps of the first aspect, and also to transfer to the mobile application the machine-readable code encoding the transaction flow.

According to a fifth aspect there is provided a method of executing a transaction at a self-service terminal, the method comprising the steps of: (i) ascertaining if an encoded transaction flow is provided by a user of the terminal, (ii) using the provided transaction flow in the event that an encoded transaction flow has been provided by the user, and (iii) using a stored transaction flow in the event that an encoded transaction flow has not been provided by the user.

It should now be appreciated that these aspects have the advantage that they allow a unique consumer flow experience to be generated and executed on multiple platforms independent of the technology used to provide the application services. These aspects also provide the ability to respond quickly to demand for new types of transactions. These aspects also provide the ability to extend an application transaction set without developing software or issuing a new download for updating software on a network of SSTs (such as ATMs).

According to a sixth aspect there is provided a method of executing a transaction on a mobile phone, the method comprising: capturing a machine-readable code from a self-service terminal; interpreting the read code to ascertain a sequence of states to be executed by an application on the mobile phone; parsing each state to ascertain user interaction information for that state; implementing the ascertained user interaction information for that state; receiving an input from the user in response to the user interaction information; moving to a next state in the sequence of states until a final state is reached indicating the completion of the transaction.

The step of capturing a machine-readable code from a self-service terminal may include capturing an image of a 2D barcode presented on a display of the self-service terminal.

By virtue of this aspect, a user is able to execute a new transaction on his/her mobile device (provided no physical delivery or deposit of cash is required) by capturing and interpreting a code presented on an SST. The code may have been generated specifically for the user, and may include pre-populated fields that are specific to the user.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
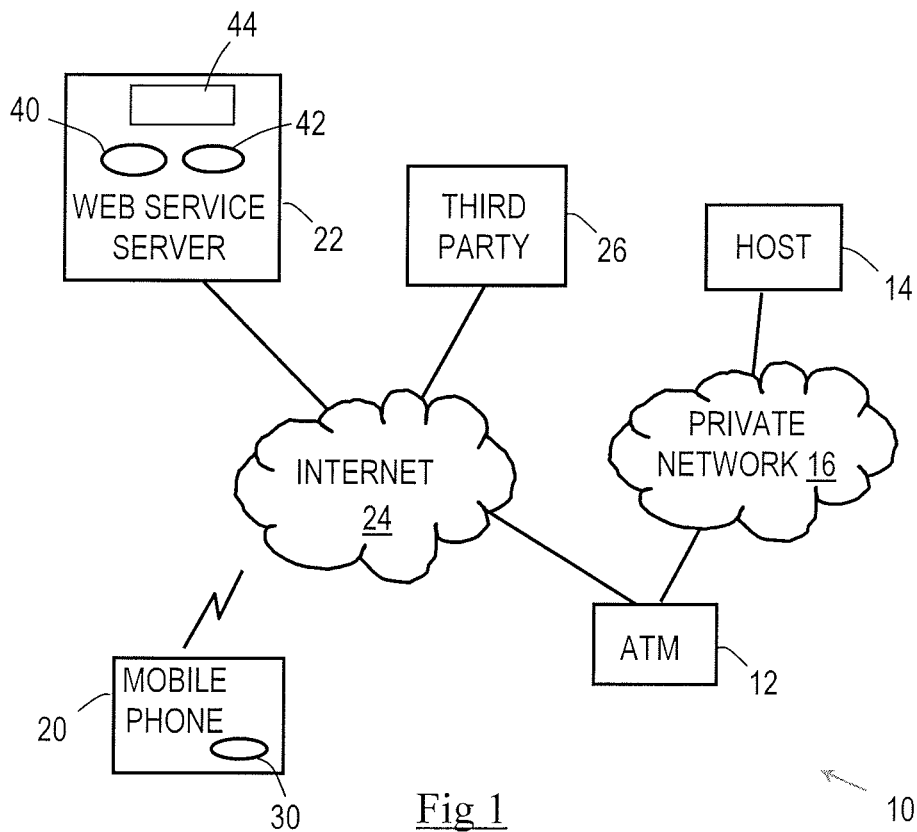
FIG. 1 is a simplified schematic diagram illustrating a system for encoding and executing a transaction flow, according to one embodiment of the present invention.

Reference will now be made to FIG. 1, which is a simplified schematic diagram of a system 10 for encoding and executing a transaction flow, according to one embodiment of the present invention.

The system 10 comprises a self-service terminal 12 (in the form of an ATM) connected to an authorization host 14 via a private IP network 16. The system 10 also comprises a mobile phone 20 that can connect to a Web service server 22 via the Internet 24. A third party Web site 26 (referred to as a "transacting party") is also connected to the Internet 24.

The mobile phone 20 has downloaded an application (an "app") 30 created by the operator of the Web service server 22. The app 30 allows a user of the mobile phone 20 to create new transactions for executing at the ATM 12, as will be described in more detail below. In this example, the operator of the Web service server 22 is a financial institution (such as a bank) that maintains an account for the user of the mobile phone 20.

The Web service server 22 includes a validation and encoding program 40, and a security program 42. The Web service server 22 also includes a state and flow repository 44 containing: (i) state information for use in a transaction flow, and (ii) transaction flow templates for generic transaction types.

The state information includes: state types (such as a card read state, a PIN entry state, and the like), details of text to display for each state type (such as, "Please insert your card", "Please place your finger on the reader", "Please enter your PIN", and the like), details of inputs enabled for each state type (such as, a card reader, a biometrics reader, the encrypting PINpad, FDKs, and the like), details of the next state to move to depending on the input activated by the user, and the like.

The transaction flow templates provide a sequence of stages required for each transaction type. For example, a transaction flow template for an item purchase transaction type may comprise: a token present stage, followed by a payment type stage, followed by a third party communication stage, followed by a receipt stage. Each of these stages may be populated with one or more states, depending on selections made by the user, as will be described in more detail below. For example, the validation and encoding program 40 may populate the token present stage with a card read state (if the user wants to use a card as part of the authentication mechanism) and/or a biometrics read state, depending on the authentication mechanism selected by the user. As another example, the validation and encoding program 40 may populate the payment stage with a cash deposit state, a credit card payment state, or the like, depending on the payment mechanism that the user wants to use.

The transaction flow templates provide basic stages that can be used in a new transaction flow. The state information provides a library of states. The validation and encoding program 40 can populate each stage with one or more relevant states from the library of states to create a customized transaction flow, as will be described in more detail below.

Figure 2:
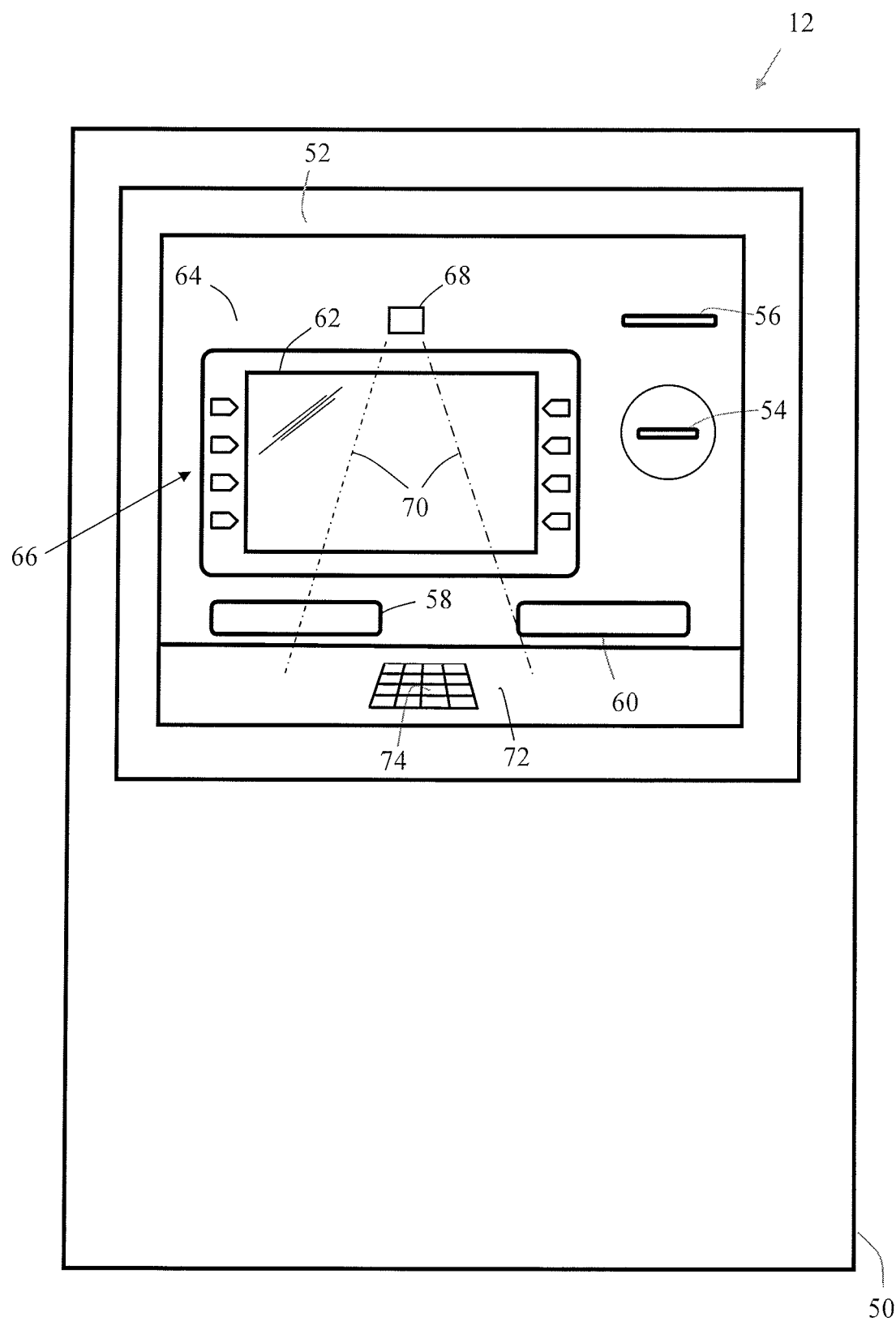
FIG. 2 is a pictorial diagram illustrating a part (an SST, in the form of an ATM) of the system of FIG. 1 in more detail.

Reference will now also be made to FIG. 2, which is a pictorial diagram illustrating the ATM 12 of the system 10 in more detail.

The ATM 12 comprises a cabinet 50 on which is mounted a plastic fascia 52. The fascia 52 provides apertures (or slots) aligning with internal devices (not shown), and defines: a card reader slot 54; a receipt printer slot 56; a deposit slot 58 (which is closed by a shutter (not shown) when not being used for depositing media items); and a dispenser slot 60 (which is closed by a shutter (not shown) when not being used for dispensing banknotes).

A display 62 is mounted on an upright portion 64 of the fascia 52 and is operable to present screens to a user of the ATM 12. Two columns of Function Defined Keys (FDKs) 66 are provided, each column being adjacent to one of the vertical sides of the display 62. As used herein, a display refers to hardware, and a screen refers to software (that is, information and controls rendered on the display).

The ATM 12 also comprises a barcode reader 68 that can image any barcode (1D or 2D) presented within a field of view illustrated by broken lines 70.

The fascia 52 provides a shelf portion 72 on which is mounted an encrypting personal identification number (PIN) keypad 74 (referred to as an encrypting PINpad).

The ATM 12 also includes various modules which are not illustrated. These modules include a cash dispenser, a depository, a card reader, a printer, (all four of which are aligned with their respective apertures in the fascia 52), and the like. The modules in the ATM 12 are controlled by a PC core controller module (not shown).

Figure 3:
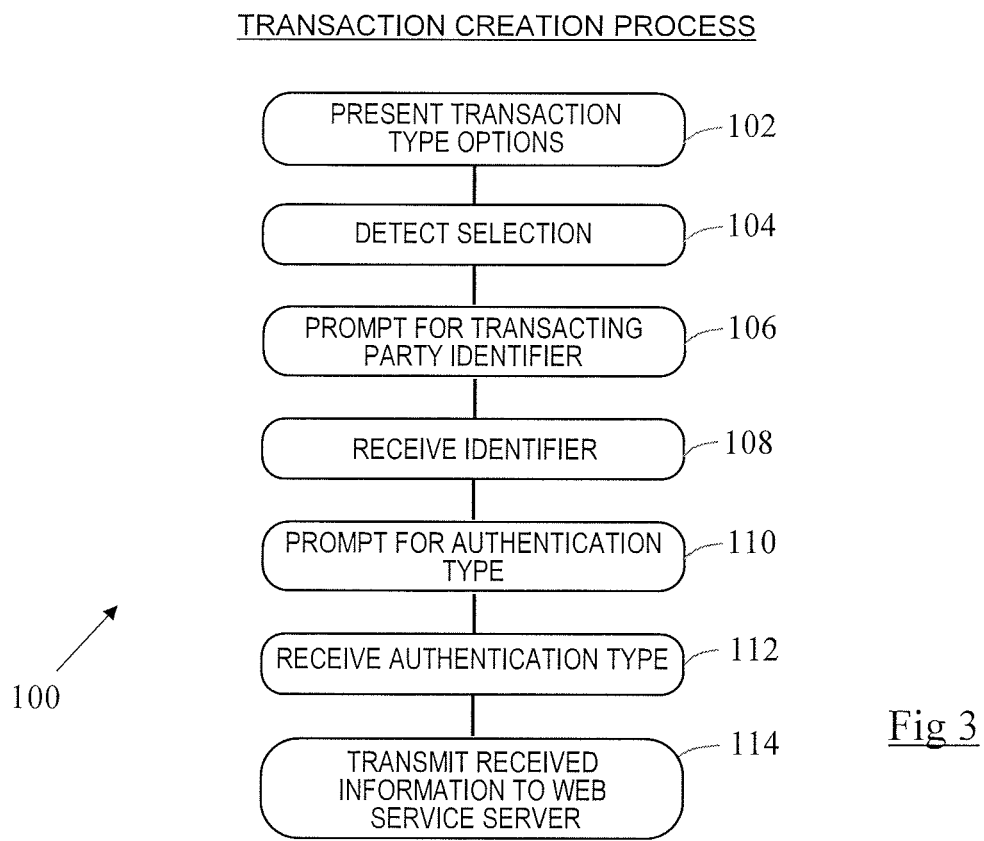
FIG. 3 is a flowchart illustrating steps performed by one part (a mobile phone) of the system of FIG. 1 when a user creates a new transaction flow.

The operation of the system 10 will now be described. Reference will now be made to FIG. 3, which is a flowchart 100 illustrating steps performed by the mobile phone app 30 when a user creates a new transaction.

When the mobile phone app 30 was downloaded, the user provided some basic information about himself/herself, which may include card data, account data, and the like. This basic information was incorporated securely into the mobile phone app 30, for use by the mobile phone app 30.

Initially, the user launches the mobile phone app 30. The mobile phone app 30 then prompts the user to select a generic transaction type (step 102). Examples of generic transaction types include: bill payment, funds transfer, item purchase, and the like.

In this example, the user selects the item purchase option. The mobile phone app 30 detects and stores this selection (step 104).

The mobile phone app 30 then prompts the user to identify the transaction party (step 106). In other words, the party from which the item is to be purchased. In this example, the user desires to buy a song in MP3 format and a video from a Web site called "Banana Tunes", so the user enters the URL for this Web site. The mobile phone app 30 receives and stores this URL (step 108).

The mobile phone app 30 then prompts the user to select an authentication mechanism for this transaction (step 110).

In this example, the user selects a one-time code as the authentication mechanism, and enters the one-time code; although in other examples a card and PIN mechanism may be selected, a biometrics mechanism, or the like. The mobile phone app 30 detects this selection and the entered code (step 112).

The mobile phone app 30 then transmits all of the received information to the Web service server 22 (via a secure connection) to request an encoded transaction flow for this transaction (step 114).

Figure 4:
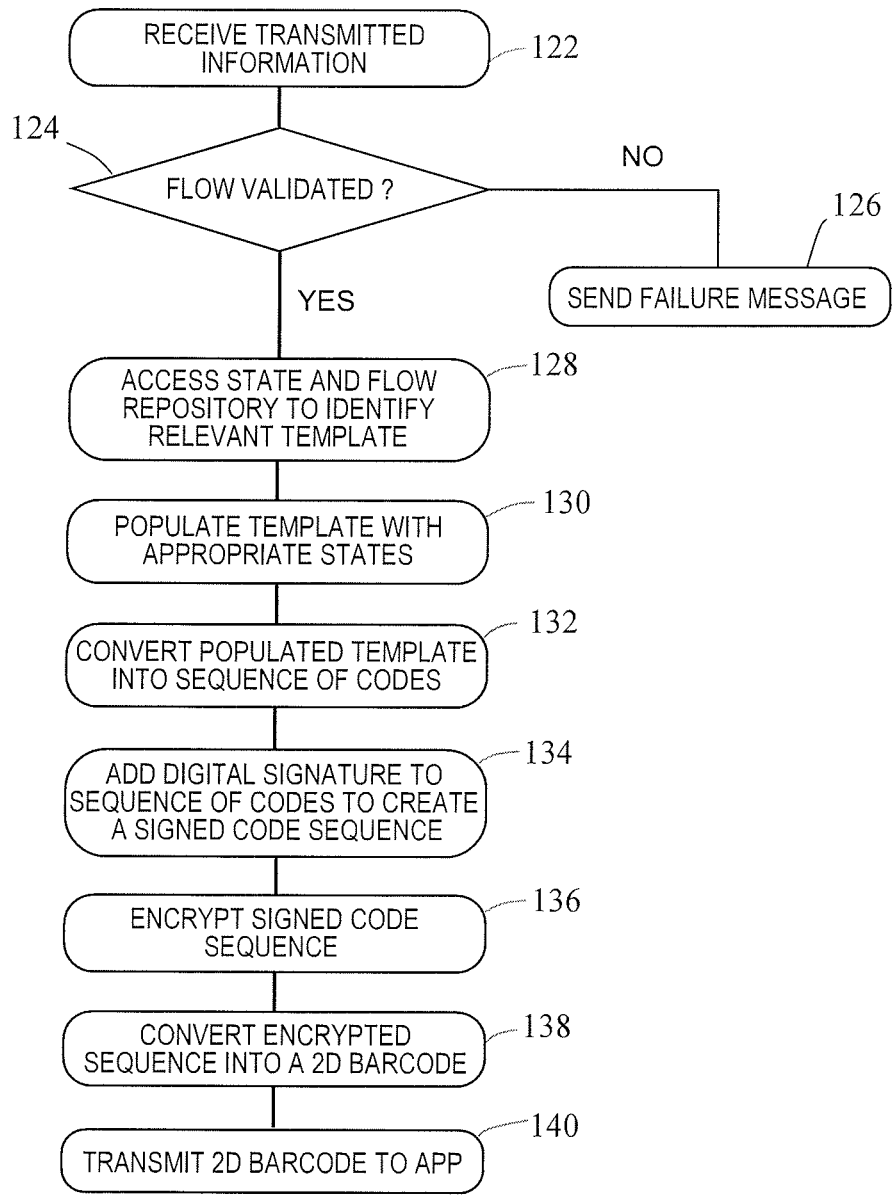
FIG. 4 is a flowchart illustrating steps performed by another part (a Web service server) of the system of FIG. 1 when the mobile phone requests an encoded transaction flow for the new transaction.

The operation of the Web service server 22 will now be described with reference to FIG. 4, which is a flowchart 120 illustrating steps performed by the Web service server 22 when the mobile phone app 30 requests an encoded transaction flow for the new transaction.

The Web service server 22 receives the information transmitted from the mobile phone app 30 (step 122). The Web service server 22 then validates the transaction flow using the validation and encoding program 40 (step 124). This validation is performed to ensure that the transaction can be executed by an ATM, such as ATM 12. In this example, the validation includes contacting the Web site for the transacting party ("Banana Tunes") to confirm that the URL is correct and to ascertain any specific command structure required to purchase an item from that Web site. The validation also includes verifying that there is a transaction flow template for the type of transaction referenced by the transmitted information.

If the transaction flow cannot be validated, or fails validation, then the Web service server 22 informs the mobile phone app 30 that the transaction flow cannot be created successfully (step 126). The mobile phone app 30 presents this message to the user.

If the transaction flow is validated, then the Web service server 22 uses the received information to create a transaction flow. This is implemented by the validation and encoding program 40 accessing the state and flow repository 44 to identify a relevant transaction flow template, in this example an item purchase flow template (step 128). The validation and encoding program 40 then populates each stage of that item purchase transaction flow template with one or more states (step 130). The states are selected based on the user selections provided in the transaction creation process 100 (FIG. 3).

Once the item purchase transaction flow template has been fully populated, the validation and encoding program 40 converts the populated template into a sequence of codes (state codes and interaction codes) and text (step 132). The populated template represents a new transaction flow for an item purchase transaction with the transacting party identified by the user at step 108 of the transaction creation process 100.

The security program 42 then adds a digital signature to the sequence of codes to create a signed code sequence (step 134) and encrypts the signed code sequence to create an encrypted code sequence (step 136).

The validation and encoding program 40 then converts the encrypted code sequence into a 2D barcode (in this embodiment a QR code (trade mark)) (step 138).

The validation and encoding program 40 then transmits the QR code to the mobile phone app 30 (step 140).

Figure 5:
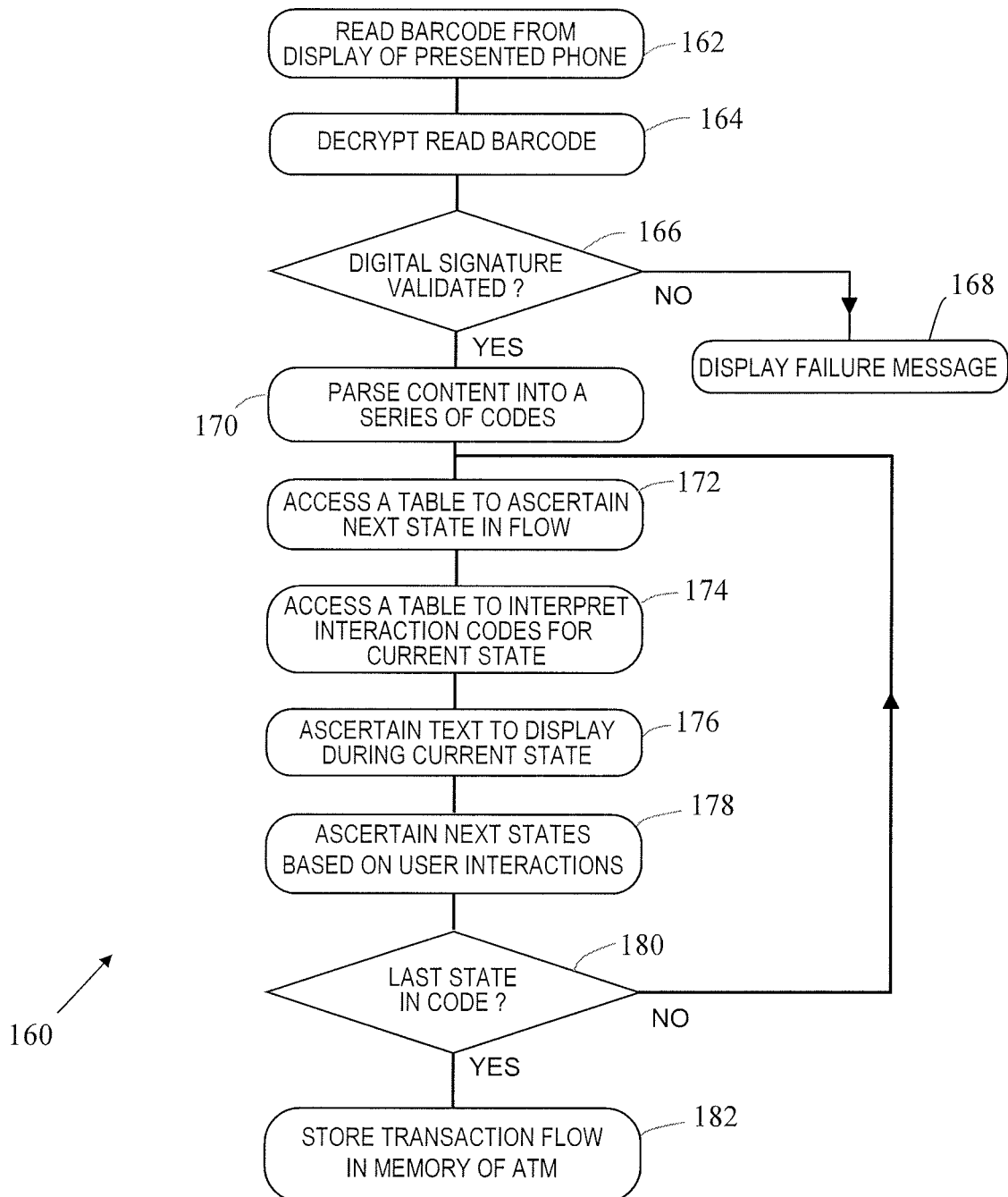
FIG. 5 is a flowchart illustrating steps performed by the ATM of FIG. 2 when the user presents the encoded transaction flow to the ATM.

The mobile phone app 30 receives this transmitted code and alerts the user that a new transaction flow has been received. The user can then go to the ATM 12 to conduct a transaction using the transmitted code, as will now be described with reference to FIG. 5, which is a simplified flowchart 160 illustrated steps performed by the ATM 12 to execute a transaction based on the new transaction flow.

When the user is at the ATM 12, the user launches the mobile phone app 30, which presents the received QR code on the mobile phone display. The user then presents the mobile phone display to the barcode reader 68. The ATM barcode reader 68 reads this barcode (step 162).

The ATM 12 then decrypts the read barcode (step 164) and validates the digital signature of the decrypted barcode (step 166).

If the digital signature is not validated (or if the barcode cannot be decrypted) then the ATM 12 presents a transaction failure notification on the ATM display 62 (step 168).

If the digital signature is validated, then the ATM 12 parses the content of the barcode (the QR code) to create a sequence of codes and text (corresponding to the sequence of codes and text from step 132 of the transaction encoding process 120) (step 170).

The ATM 12 then accesses a state table (not shown) to interpret the first state code in the sequence of codes and thereby ascertain the first of the sequence of states to be executed as part of this new transaction (step 172). In this example, the first state is the transaction confirmation state.

The ATM 12 then accesses an interaction table (not shown, but may be part of the state table) to interpret the interaction codes for the first of the sequence of states (step 174). The interaction codes identify inputs (such as FDKs and PINpad keys) to be enabled for that state. In the transaction confirmation state, three inputs are enabled. These inputs are: the second FDK from the top on the left side of the display 62; second FDK from the top on the left side of the display 62, and the lowest FDK on the left side of the display 62.

The ATM 12 also parses the content of the barcode to ascertain text to be displayed to the user while the ATM 12 is in that state (step 176). In the transaction confirmation state there are four text fields to be displayed on the ATM display 62. The first text field includes the text: "Please confirm that you wish to purchase an item from Banana Tunes". The second text field includes the text "Yes" aligned with the second FDK from the top on the right side of the display 62; the third field includes the text "No" aligned with the second FDK from the top on the left side of the display 62, and the fourth field includes the text "Cancel" aligned with the lowest FDK on the left side of the display 62.

The ATM 12 also parses the content of the barcode to ascertain the next states to move to depending on which input is activated by the user (step 178). The transaction confirmation state includes two next state options.

The first next state option is the authentication state. Transfer to this state is dependent on the user pressing the second FDK from the top on the right side of the display 62 (which aligns with the "Yes" text) during the transaction confirmation state.

The second next state option is the cancel state. Transfer to this state is dependent on the user pressing either (i) the second FDK from the top on the left side of the display 62 (which aligns with the "No" text) during the transaction confirmation state, or (ii) the lowest FDK on the left side of the display 62 (which aligns with the "Cancel" text).

The ATM 12 then parses the next state in the QR code by repeating steps 172 to 178, until all of the states have been parsed (step 180). Once all of the states have been parsed, the ATM 12 has created a decoded transaction flow that can be used to execute a transaction for the user. The ATM 12 stores this decoded transaction flow in memory (not shown) (step 182).

Figure 6A:
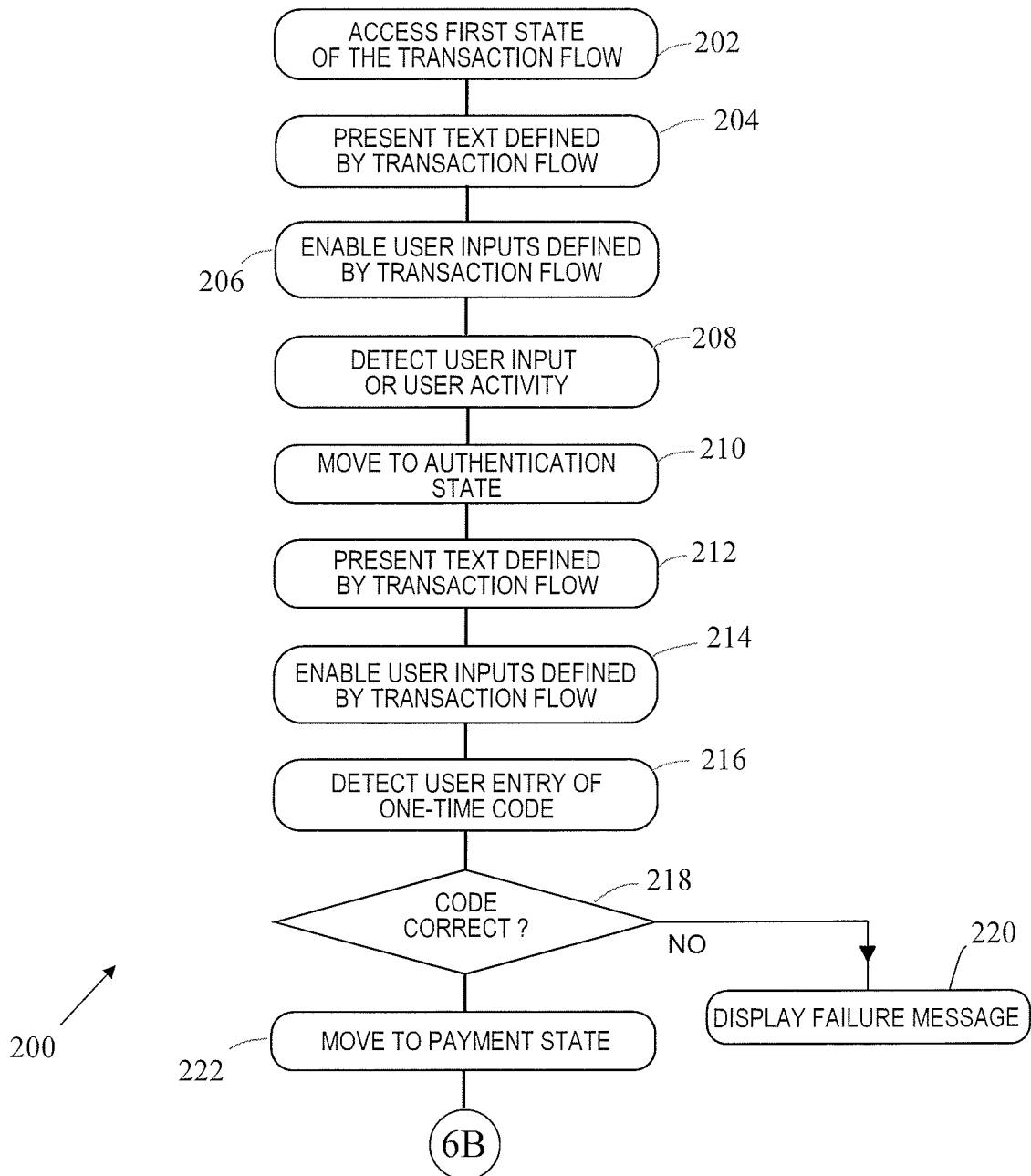
FIG. 6 is a simplified flowchart (split over two pages in the drawings for clarity) illustrating steps performed by the ATM of FIG. 2 to execute a transaction based on the encoded transaction flow.
Figure 6B:
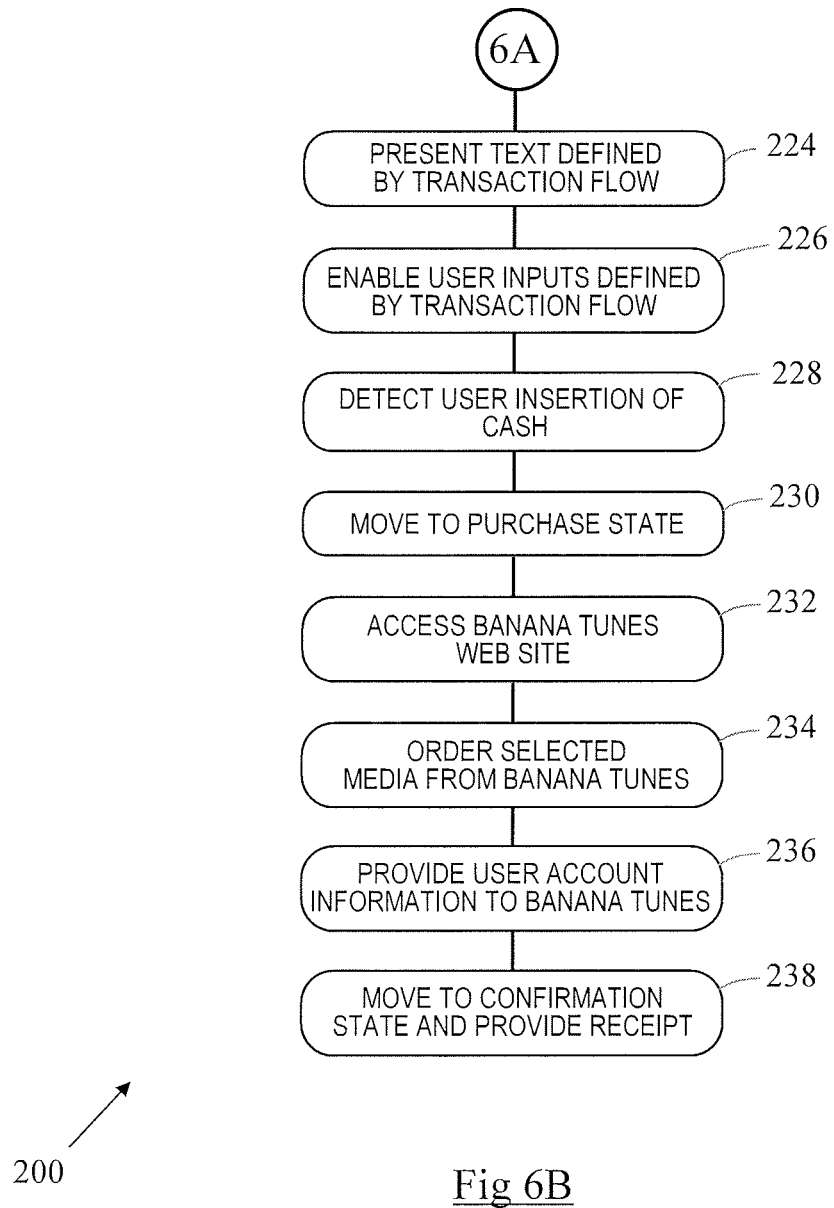

Once all of the states have been parsed, the ATM 12 then implements a transaction, as will now be described with reference to FIG. 6, which is a simplified flowchart 200 illustrating the steps performed by the ATM 12 to execute a transaction based on the decoded transaction flow.

Initially, the ATM 12 accesses the first state, which, in this example, is the transaction confirmation state (step 202).

The ATM 12 then presents on the display 62 the text defined for this first state by the decoded transaction flow (step 204), and enables the appropriate user inputs (step 206) as defined by the decoded transaction flow.

The ATM 12 then detects an input made by the user (or an activity of the user, such as presenting a card or other token) (step 208) and ascertains from the decoded transaction flow a next state to move to.

The ATM 12 then moves to this next state, which, in this example, is the authentication state (step 210).

The ATM 12 then presents on the display 62 the text defined for the authentication state by the decoded transaction flow (step 212), and enables the appropriate user inputs (step 214) as defined by the decoded transaction flow. In this example, the ATM 12 enables the encrypting PINpad 74.

The text invites the user to enter the one-time code selected during step 112 of the transaction creation process 100 (FIG. 3).

At the authentication state, the user enters a one-time code, which the ATM 12 detects (step 216).

The ATM 12 then compares the entered one-time code with the one-time code selected by the user at step 112 of the transaction creation process 100 (FIG. 3), which was encoded in the barcode (step 218).

If the entered one-time code does not match the stored one-time code, then the ATM 12 presents a screen informing the user that the transaction will not be completed (step 220).

If the entered one-time code does match the stored one-time code, then the ATM 12 moves to the payment state (step 222).

The ATM 12 then presents on the display 62 the text defined for the payment state by the decoded transaction flow (step 224), and enables the appropriate user inputs (step 226) as defined by the decoded transaction flow. In this example, the ATM 12 enables a cash deposit module that aligns with the deposit slot 58, so that the user can insert cash.

In this example, the user inserts cash in the amount of ten dollars ($10), which user activity is detected by the ATM 12 (step 228).

The ATM 12 then ascertains from the decoded transaction flow a next state to move to, which in this example is the purchase state, and moves to this state (step 230).

In the purchase state, the ATM 12 retrieves a URL for the Banana Tunes Web site (which was stored in the decoded transaction flow) and uses this retrieved URL to access the Banana Tunes Web site (step 232).

Once the ATM 12 has established a session with the Banana Tunes Web site, the ATM 12 then orders the song and video (collectively, "media", individually, a "media item") selected by the user when the transaction flow was originally created (step 234) and confirms to the Banana Tunes Web site that payment has been received (or alternatively, the ATM 12 may effect payment during the session) for these ordered media items. Identifiers for these media items are stored in the decoded transaction flow.

The ATM 12 provides the Banana Tunes Web site with information about the user's account with Banana Tunes to enable the Banana Tunes Web site to transfer the ordered media directly to the user's account (step 236). This enables the user to access the transferred media from his/her mobile device.

The ATM 12 then moves to the confirmation state, at which the ATM 12 informs the user that the transaction has been completed (using text from the decoded transaction flow for this state) and provides the user with a receipt (via the receipt printer slot 56) using details provided by the Banana Tunes Web site when the media items were ordered by the ATM 12 (step 238).

Once the transaction has been fully executed, the decoded transaction flow can be deleted.

It should now be appreciated that the above embodiment has the advantage that a new transaction flow can be executed by an ATM without that ATM having to be coded in advance.

Figure 7:
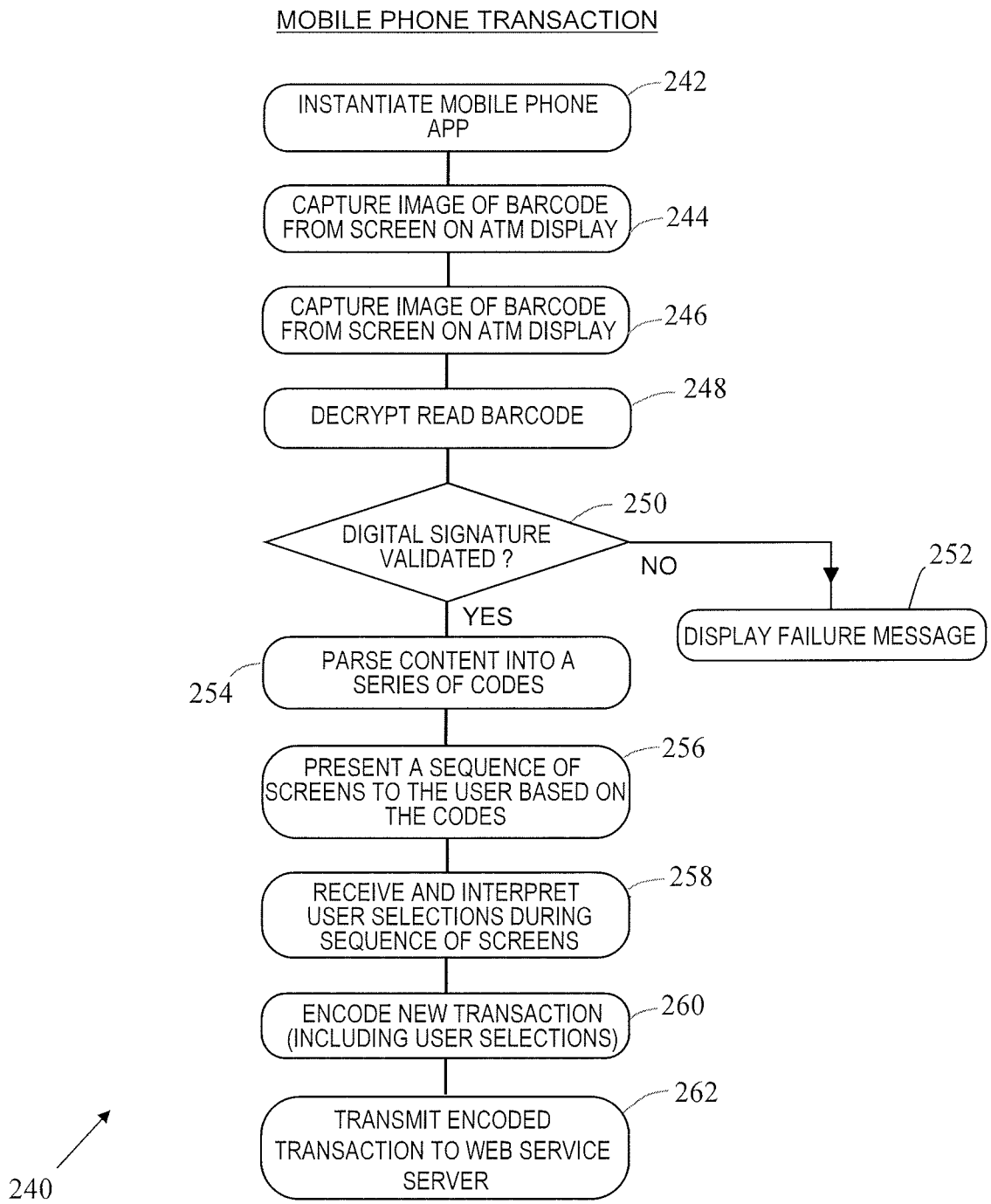
FIG. 7 is a flowchart illustrating steps performed by the mobile phone in executing a transaction flow received from the ATM.

In another embodiment, the user can execute a transaction on his/her mobile device 20 by capturing a barcode presented by the ATM 12. In other words, in addition to the user providing the ATM 12 with a barcode encoding a transaction flow, the ATM 12 may also provide the user with a barcode encoding a transaction flow for executing on the user's mobile phone 20. One example of this will now be described with reference to FIG. 7, which is a flowchart 240 illustrating steps performed by the user's mobile phone 20 in executing a transaction flow received from the ATM 12.

Initially, the ATM 12 informs the user via the ATM display 62 that a customized transaction is available for the user and can be executed by capturing an image of a barcode (in this embodiment, a QR code) presented a screen on the display 62.

In response to this, the user launches the mobile phone app 30 (step 242) and captures an image of the barcode using a camera (not shown) in the mobile phone 20 (step 244). The mobile phone app 30 decodes this captured image of the barcode (step 246) to produce a text string.

The mobile phone app 30 then decrypts the decoded barcode (step 248) and validates the digital signature of the decrypted barcode (step 250).

If the digital signature is not validated (or if the barcode cannot be decrypted) then the mobile phone app 30 presents the user with a transaction failure notification on the mobile phone 20 (step 252).

If the digital signature is validated, then the mobile phone app 30 parses the content of the barcode (the QR code) to create a sequence of codes and text (step 254).

The mobile phone app 30 is pre-programmed with codes that indicate information to be presented to the user.

When the mobile phone app 30 parses the content of the barcode, it presents a sequence of screens to the user on the mobile phone's display that prompt the user to enter information or make selections (step 256). Each screen is populated by information decoded from the barcode. The barcode encodes information specific to the user that has been selected by the ATM owner or operator (or an institution maintaining the account for the user). For example, this information may include a special loan rate for a pre-approved amount of money.

Once the sequence of screens has been displayed to the user, and the user has made the relevant selections, which the mobile phone app 30 receives and interprets (step 258), the mobile phone app 30 encodes the new transaction (step 260), which includes the user selections made during presentation of the sequence of screens.

The mobile phone app 30 then transmits the encoded transaction to the financial institution operating the Web service server 22 (step 262), which executes the transaction. Alternatively, the Web service server 22 may create another barcode and transmit this new barcode to the mobile phone app 30 for presenting to the ATM 12 to execute the new transaction.

Various modifications may be made to the above described embodiments within the scope of the invention, for example, in other embodiments, instead of creating a decoded transaction flow and then using this transaction flow, the ATM (or other SST or mobile device) may decode the barcode as each state is required. In other words, the SST may decode the barcode on-the-fly so that a next state is decoded only when it is required.

In other embodiments, the Web service server 22 may be operated by a third party on behalf of a financial institution that maintains the account for the customer.

In other embodiments, the transactions may not relate to bank accounts or purchasing of items.

In other embodiments, the mobile phone app 30 may create a barcode without having to transmit information to the Web service server and without having to receive a barcode from the Web service server.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:

receiving, by a server, a transaction-flow request for an encoded transaction flow for a transaction flow that is associated with a user-defined transaction, wherein receiving further includes receiving the transaction-flow request for the encoded transaction flow from a user device operated by a user and identifying a transaction type for the transaction, wherein the transaction flow comprising a sequence of stages in processing of the user-defined transaction based on the transaction type, and wherein the transaction flow for the user-defined transaction subsequently processes on a Self-Service Terminal (SST), wherein receiving the transaction flow further comprises obtaining the transaction flow;

validating, by the server, the transaction flow by:

contacting, by a validation and encoding program of the server, a website associated with a link of a transacting party of the user-defined transaction, and ascertaining a command required when making a purchase from the website;

verifying, by the validation and encoding program, that there is a transaction flow template for the transaction type of the transaction referenced by the transaction-flow request with the user-defined transaction;

populating, by the validation and encoding program, the transaction flow template as a populated transaction flow template with user selections provided from the user device and identified with the transaction-flow request for each stage of the transaction flow template;

creating, by the validation and encoding program, a new transaction flow using the link, the command, and the populated transaction flow template; and converting, by the validation and encoding program, the new transaction flow into a code sequence comprising state codes, interaction codes, and text that are to be processed by the transacting party with the transaction;

digitally signing, by the server, the code sequence;

encrypting, by the server, the digitally signed code sequence;

converting, by the server, the encrypted digitally signed code sequence of the new transaction flow into a 2 Dimensional (2D) barcode;

transmitting, by the server, the 2D barcode to the user device;

reading, by a barcode reader of the SST, the 2D barcode from a display of the user device;

decrypting, by the SST, the 2D barcode;

validating, by the SST, a digital signature of the decrypted 2D barcode by comparing the decrypted version against an expected digital signature;

parsing, by the SST, the decrypted and validated 2D barcode by obtaining the code sequence corresponding to the new transaction flow for the user-defined transaction;

processing, by the SST, the obtained code sequence by accessing a state table and producing a sequence of processing states for each state code while identifying, in the obtained code sequence, text and inputs to be enabled for each interaction code in each processing state; and executing, by the SST, the sequence of processing states by enabling the identified inputs and displaying the text identified for each processing state, wherein the SST was incapable of processing the transaction flow as originally received from the user device but does process the new transaction flow provided by the server to the user device as the 2D barcode and read by the barcode reader of the SST from the display of the user device.

2. A method according to claim 1, comprising receiving information corresponding to a type of authentication and authenticating the transaction flow using the type.

3. A method according to claim 1, wherein creating the new transaction flow further includes representing transaction inputs associated with the transaction within the new transaction flow as received inputs received from: function defined keys, keys on a numeric keypad, and a cash acceptor slot.

4. A method according to claim 1, comprising receiving information corresponding to identifying information for two transacting parties to the transaction, prior to creating the new transaction flow.

5. A method according to claim 1, encoding the new transaction flow into the machine-readable code includes encoding the new transaction flow into a two dimensional barcode.

6. A method according to claim 1, comprising encrypting the new transaction flow prior to encoding the new transaction flow into a machine-readable code.

\* \* \* \* \*